US007228353B1

(12) United States Patent
Franceschelli, Jr. et al.

(10) Patent No.: US 7,228,353 B1
(45) Date of Patent: Jun. 5, 2007

(54) GENERATING AND LAUNCHING REMOTE METHOD INVOCATION SERVERS FOR INDIVIDUAL CLIENT APPLICATIONS

(75) Inventors: Anthony J. Franceschelli, Jr., Norton, MA (US); Jeffrey S. Phillips, Northbridge, MA (US)

(73) Assignee: EMC Corporation, Hopkinton, MA (US)

( * ) Notice: Subject to any disclaimer, the term of this patent is extended or adjusted under 35 U.S.C. 154(b) by 622 days.

(21) Appl. No.: 10/109,244

(22) Filed: Mar. 28, 2002

(51) Int. Cl.
G06F 15/16 (2006.01)
G06F 3/00 (2006.01)
G06F 13/00 (2006.01)

(52) U.S. Cl. .............. 709/229; 709/203; 709/227; 719/330

(58) Field of Classification Search ........... 709/223, 709/227, 229, 224, 203; 719/330
See application file for complete search history.

(56) References Cited

U.S. PATENT DOCUMENTS

| | | | | |
|---|---|---|---|---|
| 5,329,619 A | * | 7/1994 | Page et al. | 709/203 |
| 5,455,953 A | * | 10/1995 | Russell | 710/266 |
| 5,553,242 A | * | 9/1996 | Russell et al. | 709/227 |
| 5,761,507 A | * | 6/1998 | Govett | 718/101 |
| 5,864,669 A | * | 1/1999 | Osterman et al. | 709/203 |
| 6,067,580 A | * | 5/2000 | Aman et al. | 719/330 |
| 6,144,999 A | * | 11/2000 | Khalidi et al. | 709/219 |
| 6,163,856 A | * | 12/2000 | Dion et al. | 714/4 |
| 6,202,089 B1 | * | 3/2001 | Juster | 709/219 |
| 6,247,057 B1 | * | 6/2001 | Barrera, III | 709/229 |
| 6,377,993 B1 | * | 4/2002 | Brandt et al. | 709/227 |
| 6,453,362 B1 | * | 9/2002 | Bittinger et al. | 719/316 |
| 6,539,494 B1 | | 3/2003 | Abramson et al. | |
| 6,539,949 B2 | | 4/2003 | Christensen | |
| 6,574,661 B1 | * | 6/2003 | Delano et al. | 709/223 |
| 6,621,505 B1 | | 9/2003 | Beauchamp et al. | |
| 6,631,402 B1 | | 10/2003 | Devine et al. | |
| 7,107,534 B1 | | 9/2006 | de Jong et al. | |
| 2005/0241713 A1 | | 11/2005 | Franceschelli et al. | |

OTHER PUBLICATIONS

Kirch, Olaf. "NFS File Locking", published Jul. 15, 1995, 4 pages.*
U.S. Appl. No. 10/109,013, filed Mar. 28, 2002, Franceschelli et al., entitled "Backup Reporting Framework Graphical User Interface."

* cited by examiner

Primary Examiner—David Wiley
Assistant Examiner—George C. Neurauter, Jr.
(74) Attorney, Agent, or Firm—Daly, Crowley, Mofford & Durkee, LLP

(57) ABSTRACT

A method of providing and launching private RMI servers for individual client applications is presented. A user software component such as a Web Accessible GUI is launched for a user. The user logs-in through the user component wherein a single RMI WAG Server process is provided for each client GUI or CLI invoked by the user.

12 Claims, 5 Drawing Sheets

GENERATING AND LAUNCHING REMOTE METHOD INVOCATION SERVERS FOR INDIVIDUAL CLIENT APPLICATIONS

CROSS REFERENCE TO RELATED APPLICATIONS

Not Applicable.

STATEMENT REGARDING FEDERALLY SPONSORED RESEARCH

Not Applicable.

FIELD OF THE INVENTION

The present invention relates generally to a system handling user requests, and more specifically to a mechanism for providing and launching respective RMI servers for individual client applications.

BACKGROUND OF THE INVENTION

As is known in the art, computer systems that process and store large amounts of data typically include one or more processors in communication with a shared data storage system in which the data is stored. The data storage system can include one or more storage devices, such as disk drives. To minimize data loss, the computer systems can also include a backup storage system in communication with the primary processor and the data storage system.

Known backup storage systems can include a backup storage device (such as tape storage or any other storage mechanism), together with a system for placing data into the storage device and recovering the data from that storage device. To perform a backup, the host copies data from the shared storage system across the network to the backup storage system. Thus, an actual data file can be communicated over the network to the backup storage device.

The shared storage system corresponds to the actual physical storage. For the host to write the backup data over the network to the backup storage system, the host first converts the backup data into file data, i.e., the host retrieves the data from the physical storage system level, and converts the data into application level format (e.g. a file) through a logical volume manager level, a file system level and the application level. When the backup storage device receives the data file, the backup storage system can take the application level data file, and convert it to its appropriate format for the backup storage system. If the backup storage system is a tape-based device, the data is converted to a serial format of blocks or segments.

The EMC Data Manager (EDM) is capable of such backup and restore over a network, as described in numerous publications available from EMC of Hopkinton, Mass., including the EDM User Guide (Network) "Basic EDM Product Manual." An exemplary prior art backup storage architecture in which a direct connection is established between the shared storage system and the backup storage system is described in U.S. Pat. No. 6,047,294, assigned to assignee of the present invention, entitled Logical Restore from a Physical Backup in Computer Storage System, and incorporated herein by reference.

For large databases, tape-based data backup and restore systems, which are well known in the art, can be used. In general, files, databases and the like are copied to tape media at selected times. Typically, data is periodically backed up to prevent the loss of data due to software errors, human error, and hardware failures. Upon detection of an error, in an online database, for example, the backed up data can be restored to effect recovery of the data. While restore refers to obtaining backed up data, data recovery refers to the entire process in which applications can access and use the retrieved data. Transactions since the time of backup can be recreated using so-called redo logs. One disadvantage associated with the above backup reporting mechanism, is that multiple users may want to generate various reports on the backup processes which in turn results in limited availability of resources to handle the reporting requests of the multiple users.

It would, therefore, be desirable to overcome the aforesaid and other disadvantages by providing a mechanism to provide and launch individual RMI servers for respective individual client applications.

SUMMARY OF THE INVENTION

A method of providing and launching private RMI servers for individual client applications is presented. A user software component such as a Web Accessible GUI is launched for a user. The user logs-in through the user component wherein a single RMI WAG Server process is provided for each client GUI or CLI invoked by the user.

In another embodiment, a computer program product is presented. The computer program product includes instructions for providing a user software component through which a user can login. The computer program product further includes instruction for providing a respective RMI server process for each user that logs in.

BRIEF DESCRIPTION OF THE DRAWINGS

The invention will be more fully understood from the following detailed description taken in conjunction with the accompanying drawings, in which.

DETAILED DESCRIPTION OF THE INVENTION

Figure 1:
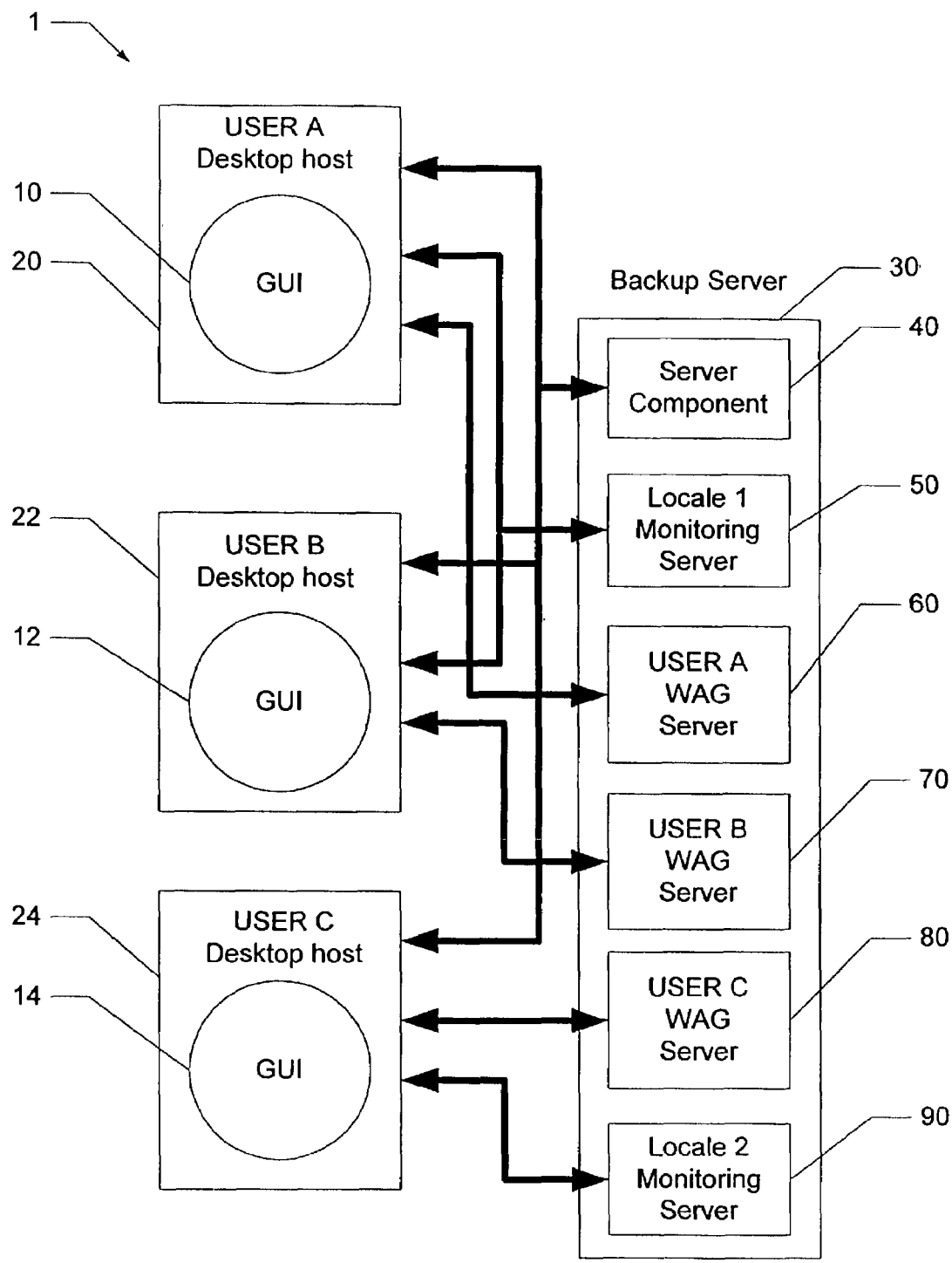
FIG. 1 is a block diagram of the mechanism for providing and launching RMI, severs for respective individual client applications.

Referring to FIG. 1, a block diagram of a backup reporting framework 1 is shown. The framework comprises a combination of components that make it possible to provide and launch individual RMI servers for respective individual client applications. The framework 1 includes a plurality of components which are resident on a backup server 30. The components include a server component 40, at least one monitoring server middleware component 50, 90 and a Remote Method invocation (RMI) web accessible GUI (WAG) server component for each respective user 60, 70 and 80. The components typically reside on a backup server 30, and provide the reporting GUIs 10, 12, and 14 to a respective remote user on the remote user's system 20, 22 and 24. It should be appreciated that additional components may also be incorporated as part of the framework.

Figure 2:
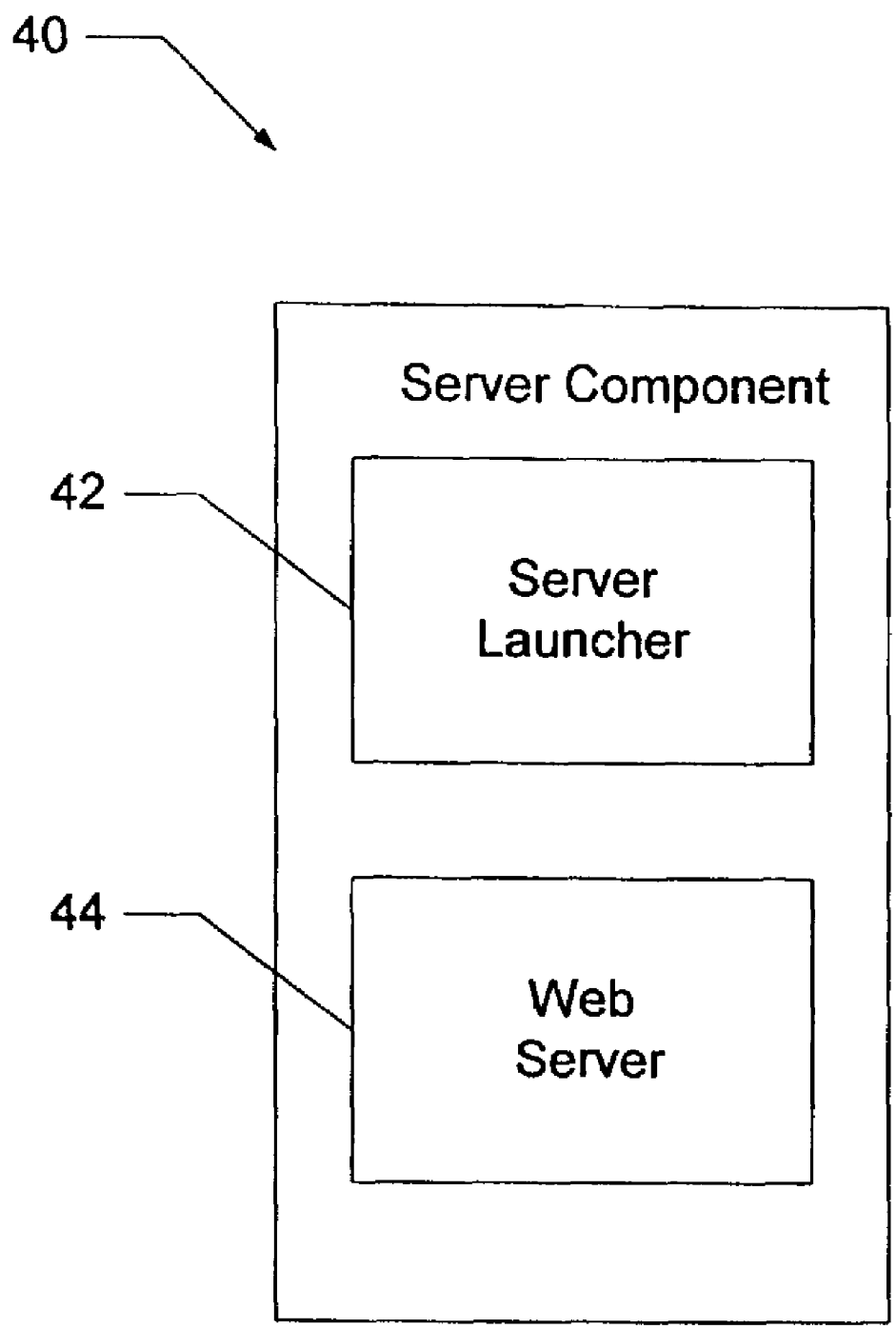
FIG. 2 is a block diagram of a server component.

Referring now to FIG. 2, a block diagram of the server component 40 is shown. The server component 40 provides the mechanisms to install and launch the Web Accessible GUI for use by a remote user. The server component 40 includes two subcomponents, a server launcher subcomponent 42 and a web server subcomponent 44. These subcomponents handle all the operations necessary to start the GUI or CLI's interaction with the monitoring server middleware component 50 and the WAG server middleware component 60. The server launcher subcomponent 42 and the web server subcomponent 44 are started by the operating system at boot time.

The server launcher subcomponent 42 is a persistent process used to create new connections and to authenticate username/password pairs for each GUI or CLI accessing the backup server 30. The server launcher subcomponent 42 is responsible for providing new RMI WAG server processes 60 for each GUI or CLI that connects to it. The connection requires a username and password that is authenticated by the Security Middleware 65 and used to obtain a User object. If the connection is successful, it will determine a unique name for the new server, start up the server (telling it what name to call itself), and pass the unique name along with the User object back to the GUI or CLI requesting access.

The Server Launcher subcomponent 42 is further responsible for starting a new RMI WAG Server 60 for each GUI or CLI requesting backup services, and for making sure a Monitoring Server exists that can provide monitoring data in the correct locale. If a request for a monitoring server 50 comes in, the server launcher 42 will determine if a running monitoring server exists to support the locale or if a new Monitoring Server 50 must be launched. The server launcher 42 will accept a username and password, authenticate it, launch a private RMI WAG Server with a unique name, and return the User object and the name of the private RMI WAG Server. The name of the RMI WAG server is kept private so that only the requesting user has access to it. This is different than other systems wherein the WAG server was available to any user, thus multiple users could access the same WAG server, thereby affecting the performance off all users accessing the WAG server. The server launcher 42 will accept a locale and return the name of a Monitoring Server 60 appropriate for the locale.

The Web-Server sub-component 44 is the code that is necessary to install and start the Web Server as well as the HTML pages that are shipped with the backup server. The Web Server provides the mechanisms to install a Web Server, update the backup server to start the installed Web Server and create the WAG HTML pages.

Figure 3:
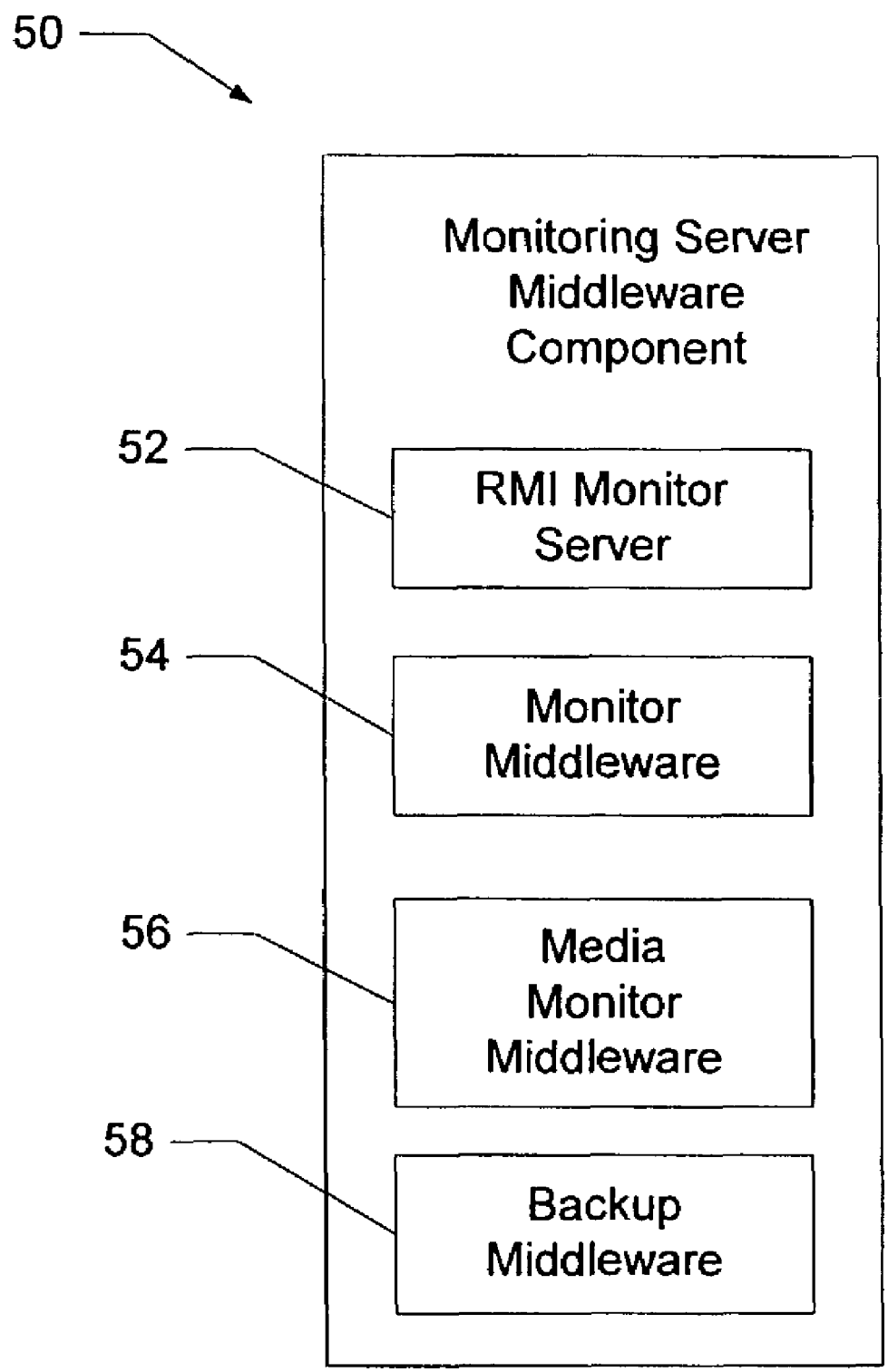
FIG. 3 is a block diagram of a monitoring server middleware component.

Referring now to FIG. 3, a block diagram of a monitoring server middleware component 50 is shown. The monitor server middleware component 50 provides the mechanism for the client application to interact with the backup server 30. The monitoring server middleware component 50 gives the client side application access to data resident on the server and allows for command and control from the client side. The monitoring server middleware component 50 allows the GUI 10 to get data about the current state of backup operations and results, and to display the information graphically on the user's remote system. The monitoring server middleware component 50 includes the following subcomponents: an RMI Monitor server subcomponent 52, a Monitor Middleware subcomponent 54, a Media Monitor Middleware subcomponent 56 and a Backup Middleware subcomponent 58. The middleware provides monitoring capabilities for all object types generically to help minimize the cost of creating new object types to monitor, and reuse code throughout the different object types. The objects passed to/from the GUI and CLI are kept at a high level and are self-describing. The GUI can simply get a monitor object and graphically display it without knowing the object type or the details of the individual object itself (i.e. workitem, lu, drive).

The public interface to the monitoring server middleware component 50 is through the RMI Monitor Server 52. This subcomponent acts as a dispatcher to the other subcomponents that provide the functionality required by the monitoring server middleware component 50. This is the gateway for which all client/server communications occurs.

The monitoring server middleware component 50 is responsible for creating a server-side (business monitor object) model of all library units, associated drives, clients and workitems upon startup. ListenerObjects are started in a separate thread at startup. This object listens to all of the notifies which it is registered to. Upon notification, the server side model is updated with changes. There are two models: one on the server side, and another on the client side (containing Monitorable objects), which are kept in synch by GUI polling.

The client GUI polls the monitoring server middleware component 50 for updates with the timestamp of the last update via the getMonitorUpdates method. The monitoring server middleware component 50 traverses the model looking for objects which have changed since the timestamp passed in by the client and sends back the changed Monitorable objects with necessary information for the GUI to display. The client side traverses its model in the background, and updates it with the modified objects. The GUI update is triggered upon the data model changing.

Each of the Monitor subcomponents (Backup and Media) provides access to the monitor data as well as the displayable definitions of each type of monitor object. The monitor definition specifies what a monitor object of that particular type is, how it is to be displayed and updated. Each monitor definition also includes what actions can be performed on these monitor objects. These actions may request more user input or go directly through to the subcomponent to perform the action on the selected result objects. Each of these subcomponents uses the Java Native Interface (JNI) to access the backup operation API's written in C and/or C++.

Figure 4:
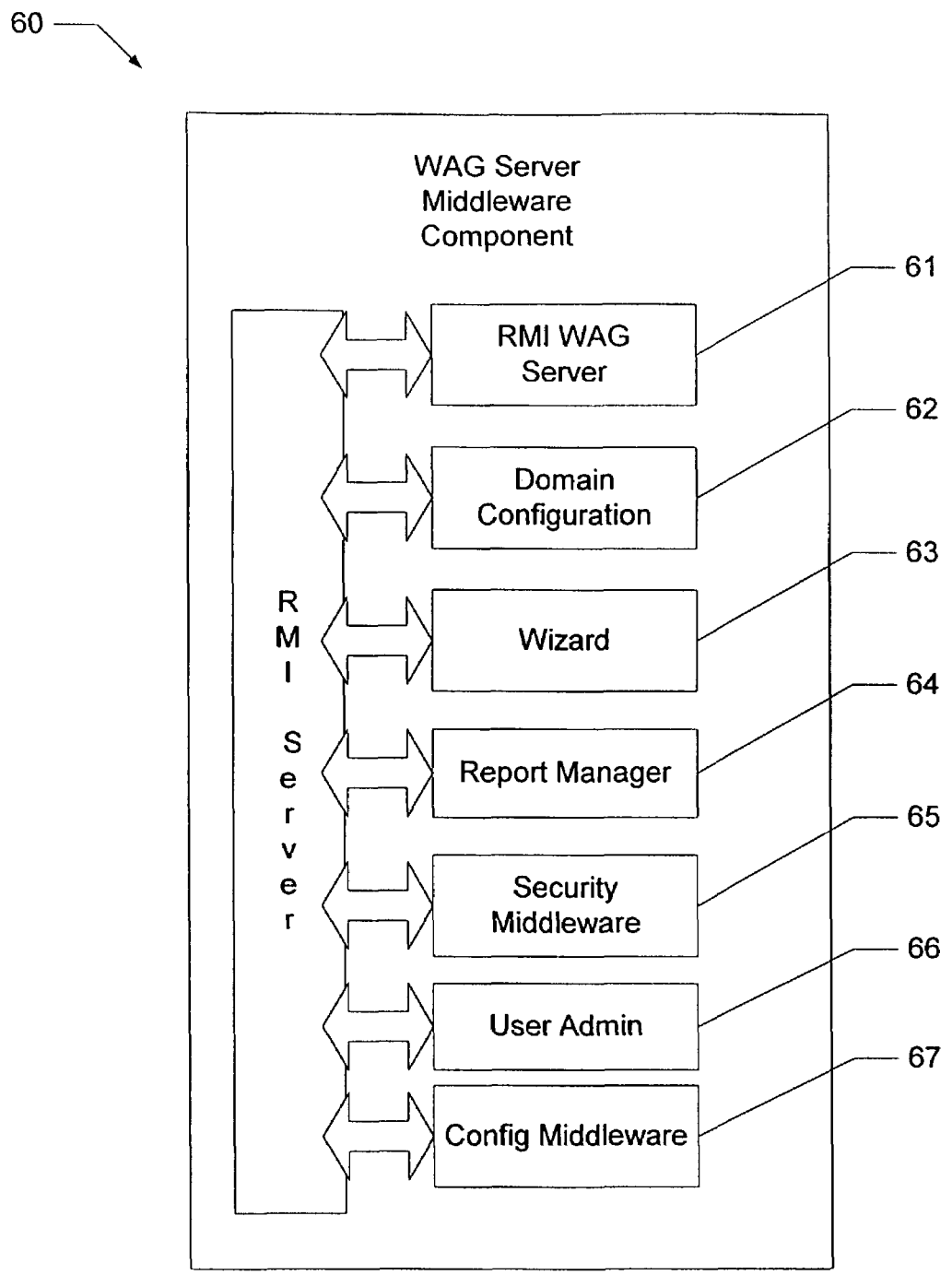
FIG. 4 is a block diagram of a WAG server middleware component.

Referring now to FIG. 4 a block diagram of the WAG Server Middleware component 60 is shown. This component 60 provides a mechanism for the client application to interact with the server. This component 60 also gives the client side application access to data resident on the server and allows for command and control from the client side.

The WAG Server Middleware component 60 allows the GUI or CLI to access and change configurations, access Wizard interfaces to facilitate activities on the backup server, as well as access, change, and execute reports of several types. The WAG Server Middleware component 60 provides groupings of common functionality across several types of activities. This allows the WAG Server Middleware component 60 to effectively reuse code and achieve maximum maintainability. The Middleware provides the major functionality of abstracting very complicated business objects into generic GUI objects where the GUI or CLI clients need not understand the behavior of an object in order to display or allow users to interact with it. This methodology affords the interactive nature of the GUI and CLI clients to be very simple, abstract, and uniform. The WAG Server Middleware component 60 is made up of the following major subcomponents: an RMI WAG Server subcomponent 61, a Domain Configuration subcomponent 62, a Wizards subcomponent 63, a Reporting subcomponent 64, a Security subcomponent 65, a User Administration subcomponent 66, and a Domain Administration subcomponent 62. A private WAG server middleware component is provided for each user. Accordingly, multiple users can run or access reports without having to share their WAG server middleware component, thereby allowing the access and reporting to occur in a timely and efficient manner.

The public interface to the WAG Server Middleware component 60 is through the RMI WAG Server 61. This is the gateway of all client/server communications. The RMI WAG Server subcomponent 61 is the gateway for the GUI and CLI clients to communicate with the WAG Server Middleware component 60. The WAG RMI Server 61 provides the methods that communicate between the GUI and CLI client to the WAG Server. It uses the Java RMI (Remote Method Invocation) interface for communications. There is one WAG RMI Server per GUI or CLI to handle the requests.

The Domain Administration subcomponent 62 is responsible for the creation, deletion, and modifying properties of the domain setup parameters. This includes setting a host as the domain master, domain participant, or individual host (not a domain participant).

The Wizard subcomponent 63 is responsible for building, distributing, and collection information from Wizard panels. It supplies the Wizard panels, and allows generic access to the standard behaviors of a Wizard, such as Next, Prev, Finish, Cancel, and Help.

The Reporting subcomponent 64 provides the generic capability to retrieve, save, modify, and delete reports at a high level. It also provides the print, email, save, and auto-schedule functionality for report results. Each of the report portions (Backup, Events, and Media) provides access to the report data as well as the report definitions for each type of report. The report definition specifies what a report of that particular type is, how it gets its results, and how the results are to be displayed. Each report definition also includes what actions can be performed on the results of the report. These actions may request more users input or go directly through to the subcomponent to perform the action on the selected result objects.

The Security subcomponent 65 is responsible for authenticating the username and password and returning a User object. This User object will provide the means to determine what privileges the GUI or CLI should grant the user. The other purpose for the Security subcomponent 65 is to audit the actions performed by the user.

The User Administration subcomponent 66 is responsible for the creation, deletion, and modifying properties of users of the Web Accessible GUI.

The Configuration subcomponent 67 is responsible for retrieval and modification of configurable parameters. This subcomponent 67 has two parts: Backup Configuration and RASD Configuration. The Backup Configuration portion is responsible for the retrieval, locking, modifying, and refreshing of the Backup Configuration of the EDM, including detailed configuration. It provides a way for multiple users to view the configuration and serializes modifications to the backup configuration. The RASD Configuration portion is responsible for the retrieval, locking, modifying, and refreshing of the RASD Configuration of the EDM. In the situation where multiple backup servers are connected together to form a domain, the present invention will allow report generation and other actions based on the whole domain and not just the backup server the user is connected to.

Figure 5:
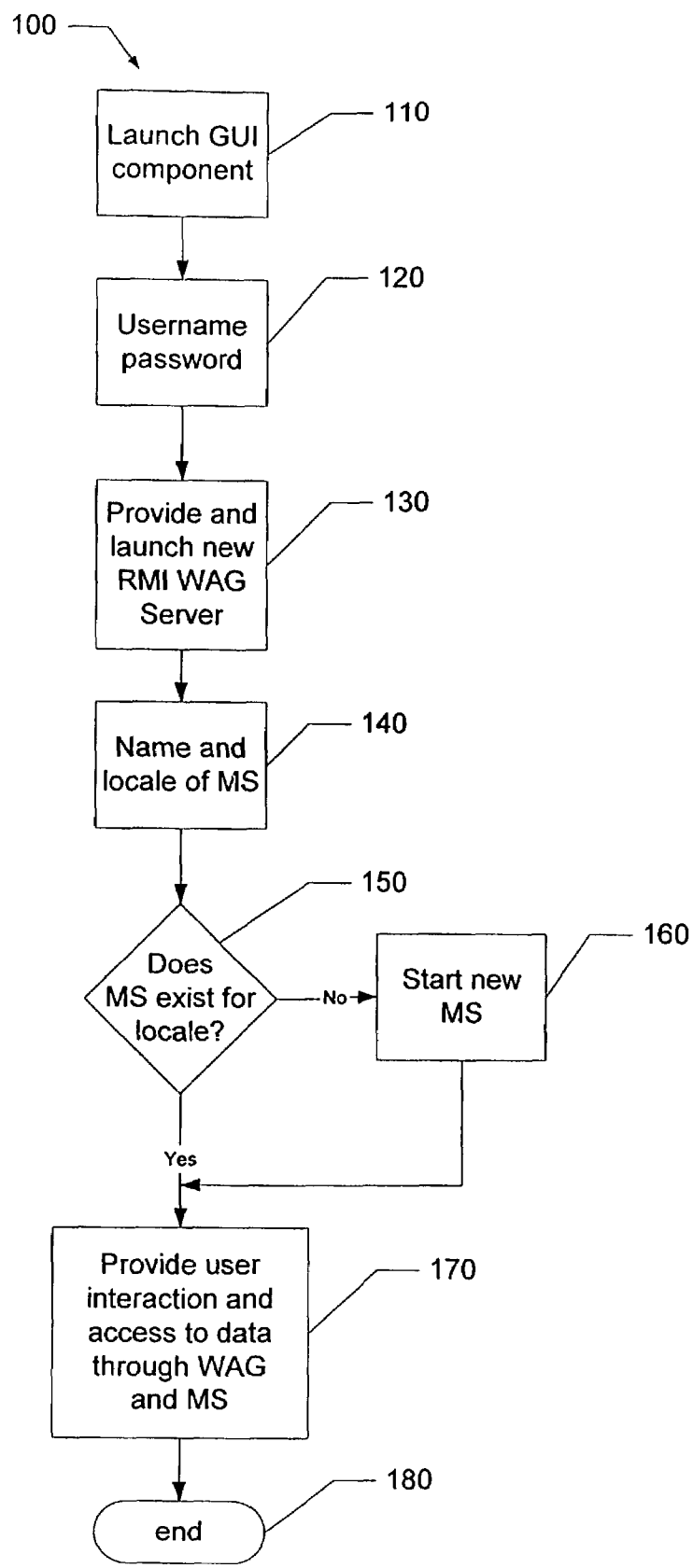
FIG. 5 is a flow diagram of presently disclosed method.

Having described the various components that comprise the present invention, the method of providing and launching RMI servers for individual client applications will now be described. A flow chart of the presently disclosed method is depicted in FIG. 5. The rectangular elements, are herein-denoted "processing blocks" and represent computer software instructions or groups of instructions. The diamond shaped elements, are herein denoted "decision blocks," represent computer software instructions, or groups of instructions which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

The process 100 begins at step 110 wherein in order to launch the GUI from the web, the Web Server delivers a WAG Hyper Text Markup Language (HTML) page to the Web Browser on the user's desktop host. This page will reference the WAG Java Language Launcher Protocol (JNLP) file. A JNLP file is a file that the Java Web Start application uses to launch Java applications from a Web Browser. This file specifies the Jar files, security levels, and the command line arguments necessary to launch the WAG GUI application.

In order to understand the JNLP file, the user will have had to install Java Web Start on their desktop. The Web Server will provide a page to download the Java Web Start application to the desktop. Once installed, the client browser will understand the JNLP extension and launch Web Start with the file.

At step 120 the GUI Component will prompt for a username and password and pass it to the Server Launcher subcomponent for verification. Upon successful login, the Server Launcher subcomponent will launch a new uniquely named Remote Method Invocation (RMI) WAG Server as shown in step 130 and pass the unique name along with the User record back to the GUI Component.

At step 140, the GUI Component will also request the name of the RMI Monitoring Server. This request will include the locale being used by the GUI Component. If the Server Launcher determines a Monitoring Server exists which can handle the given locale, as shown in step 150, the server launcher simply returns the name of the currently running monitor server. If no Monitoring Server is running that supports the given locale, step 160 is executed wherein a new Monitoring Server is started and the name of that server is returned.

At step 170, the remote user is provided access through the WAG and can perform various backup reporting functions such as the generic capability to retrieve, save, modify, and delete reports at a high level. The user also has the ability to print, email, save, and auto-schedule functionality for report results. The remote user is provided access through the Wag to the backup reporting data. At step 180 the process terminates.

As described above, the Web Accessible GUI 10 provides a single RMI WAG Server process for each client GUI or CLI invoked by the user. The Java RMI server architecture will start each RMI method in a separate thread. The Web Accessible GUI creates a single RMI Monitoring Server for each locale being used by the clients. The initial Monitoring Server is started under the standard locale. Each client that requests a connection to a Monitoring Server will pass the desired locale to the Server Launcher. If the requested locale does not have a corresponding Monitoring Server, a new server is started for that client locale. This is necessary since the Monitoring Server will be returning displayable strings to the client and these strings are locale-dependent. However, the WAG Server process will not call any of the JNI methods at the same time in separate threads. The Remote Server process will 'synchronize' these methods so that this does not occur.

There are several processes that have slightly different threading models. The GUI's threading model is to have one thread handle user interaction, events, drawing, etc., and separate threads for retrieving data from the Middleware. When the GUI refreshes the data in a window or retrieve data for the first time, it will start a separate thread to get the results. The main thread will create the window, bring up the window, and draw the window. When the data retrieval thread completes it will load the table with the data. The WAG Server process (Middleware) will have a thread for each request made through the gateway (RMI method).

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims. All publications and references cited herein are expressly incorporated herein by reference in their entirety.

What is claimed is:

1. A method for providing a private server for individual client applications comprising:
    launching a user component;
    receiving a client login through the user component;
    determining a unique name of the private server after receiving the client login;
    accessing a web accessible graphical user interface (WAG) server for the client through a remote method invocation (RMI) mechanism; and
    excluding other clients from accessing the WAG server, wherein accessing the WAG server comprises sending the unique name of the private server to the client and excluding other clients comprises excluding other clients from obtaining the unique name, accessing the WAG server comprises accessing a component of a backup server system.

2. The method of claim 1 wherein launching a user component comprises launching a graphical user interface (GUI).

3. The method of claim 1 wherein launching a user component comprises launching a command line interface (CLI).

4. The method of claim 1 wherein receiving a client login includes receiving a username.

5. The method of claim 4 wherein receiving a client login includes receiving a password associated with the username.

6. The method of claim 1 wherein accessing a component of the backup server system comprises accessing a part of a domain.

7. A computer program product comprising a computer usable medium having computer readable code thereon, including program code comprising:
    instructions for launching a user component;
    instructions for receiving a client login through the user component;
    instructions for determining a unique name of the private server after receiving the client login;
    instructions for accessing a web accessible graphical user interface (WAG) server for the client through a remote method invocation (RMI) mechanism; and
    instructions for excluding other clients from accessing the WAG server,
    wherein the instructions for accessing the WAG server comprises instructions to send the unique name of the private server to the client and the instructions to exclude other clients comprises instructions to exclude other clients from obtaining the unique name, the WAG server is a component of a backup server system.

8. The computer program product of claim 7 wherein the instructions for launching a user component comprise instructions for launching a graphical user interface (GUI).

9. The computer program product of claim 7 wherein the instructions for launching a user component comprise instructions for launching a command line interface (CLI).

10. The computer program product of claim 7 wherein the instructions for receiving a client login include instructions for receiving a username.

11. The computer program product of claim 10 wherein the instructions for receiving a client login include instructions for receiving a password associated with the username.

12. The computer program product of claim 7 wherein the WAG server is part of a domain.

* * * * *

UNITED STATES PATENT AND TRADEMARK OFFICE
CERTIFICATE OF CORRECTION

| | |
|---|---|
| PATENT NO. | : 7,228,353 B1 |
| APPLICATION NO. | : 10/109244 |
| DATED | : June 5, 2007 |
| INVENTOR(S) | : Franceschelli, Jr. et al. |

It is certified that error appears in the above-identified patent and that said Letters Patent is hereby corrected as shown below:

Col. 1, line 60-61, delete "assigned to assignee" and replace with -- assigned to the assignee --.

Col. 1, line 61-62, delete "entitled Logical Restore from a Physical Backup in Computer Storage system," and replace with -- entitled "Logical Restore from a Physical Backup in Computer Storage System", --.

Col. 2, line 41, delete "severs" and replace with -- servers --.

Col. 3, line 40, delete "off" and replace with -- of --.

Col. 4, line 44, delete "FIG. 4 a" and replace with -- FIG. 4, a--.

Col. 5, line 26, delete "collection" and replace with -- collecting --.

Col. 6, line 27, delete "Stated the" and replace with -- Stated, the--.

Col. 6, line 47, delete "Step 120 the" and replace with -- Step 120, the--.

Col. 7, line 3-4, delete "Step 180 the" and replace with -- Step 180, the--.

Col. 7, line 30, delete "completes it" and replace with -- completes, it--.

UNITED STATES PATENT AND TRADEMARK OFFICE
CERTIFICATE OF CORRECTION

PATENT NO.         : 7,228,353 B1
APPLICATION NO. : 10/109244
DATED              : June 5, 2007
INVENTOR(S)        : Franceschelli, Jr. et al.

It is certified that error appears in the above-identified patent and that said Letters Patent is hereby corrected as shown below:

Col. 7, line 33-34, delete "invention it" and replace with -- invention, it--.

Signed and Sealed this

Twentieth Day of November, 2007

JON W. DUDAS
*Director of the United States Patent and Trademark Office*